US010552015B2

(12) United States Patent
Campbell

(10) Patent No.: US 10,552,015 B2
(45) Date of Patent: Feb. 4, 2020

(54) SETTING MULTIPLE PROPERTIES OF AN ART TOOL IN ARTWORK APPLICATION BASED ON A USER INTERACTION

(71) Applicant: Adobe Inc., San Jose, GA (US)

(72) Inventor: Gabriel Campbell, San Diego, CA (US)

(73) Assignee: Adobe Inc., San Jose, CA (US)

( * ) Notice: Subject to any disclaimer, the term of this patent is extended or adjusted under 35 U.S.C. 154(b) by 750 days.

(21) Appl. No.: 14/991,287

(22) Filed: Jan. 8, 2016

(65) Prior Publication Data

US 2017/0199652 A1   Jul. 13, 2017

(51) Int. Cl.
*G06F 3/0484*   (2013.01)
*G06F 3/0482*   (2013.01)
*G06T 3/40*   (2006.01)
*G06T 3/60*   (2006.01)

(52) U.S. Cl.
CPC ........ *G06F 3/04845* (2013.01); *G06F 3/0482* (2013.01); *G06F 3/04847* (2013.01); *G06T 3/40* (2013.01); *G06T 3/60* (2013.01); *G06T 2200/24* (2013.01)

(58) Field of Classification Search
CPC .. G06F 3/03545; G06F 3/005; G06F 3/04883; G06F 3/0482; G06F 3/048; G06F 3/0484; G06F 3/0481; G06T 11/001; G06T 11/60; G06T 19/20; G06T 3/20; G06T 11/40; G06T 2207/30204; G06T 2207/10028; G06T 2219/2016; G06T 2200/24; G06T 2200/04; G06T 11/203; G06T 2219/2012; G06T 5/00; G06T 5/005; G06T 2207/10024; G06T 2207/20104; G06T 3/40; G06T 3/60; G06T 5/20; G06T 7/001
USPC ................... 715/236, 765; 700/87
See application file for complete search history.

(56) References Cited

U.S. PATENT DOCUMENTS

| 7,593,603 | B1 * | 9/2009 | Wilensky | G06T 5/00 |
| | | | | 358/1.2 |
| 8,436,821 | B1 * | 5/2013 | Plichta | G06F 3/04883 |
| | | | | 345/156 |
| 2007/0188510 | A1 * | 8/2007 | Kokemohr | G06F 3/04845 |
| | | | | 345/581 |

(Continued)

*Primary Examiner* — Matthew Ell
*Assistant Examiner* — Maria S Ayad
(74) *Attorney, Agent, or Firm* — Kilpatrick Townsend & Stockton LLP

(57) ABSTRACT

Techniques for improving a user interface (UI) of an artwork application are described. For example, the artwork application presents a digital canvas, an art tool, and a menu. The menu identifies properties of the art tool. The artwork application receives a selection of some or all of the properties and, in response, generates a UI preview element. The UI preview element is configured to present respective values of the properties on the digital canvas. This presentation includes previewing a value of at least one of the selected properties in a one-to-one ratio on the digital canvas. The artwork application presents the UI preview element on the digital canvas, thereby previewing values of the selected properties. The artwork application receives a user interaction with the presented UI preview and the UI preview element adjusts the values of the properties of the art tool based on the user interaction with the UI preview element.

16 Claims, 11 Drawing Sheets

(56) References Cited

U.S. PATENT DOCUMENTS

| | | | | |
|---|---|---|---|---|
| 2011/0109646 A1* | 5/2011 | Ahmann | ............... | G06F 3/0481 |
| | | | | 345/619 |
| 2014/0365934 A1* | 12/2014 | Moore | ................ | G06F 3/04815 |
| | | | | 715/769 |
| 2015/0149964 A1* | 5/2015 | Bernstein | ............ | G06F 3/04815 |
| | | | | 715/836 |
| 2015/0350136 A1* | 12/2015 | Flynn, III | ............... | H04L 51/10 |
| | | | | 715/752 |

* cited by examiner

SETTING MULTIPLE PROPERTIES OF AN ART TOOL IN ARTWORK APPLICATION BASED ON A USER INTERACTION

TECHNICAL FIELD

This disclosure relates generally to techniques for improving a user interface (UI) of an application configured to generate digital artwork.

BACKGROUND

Many applications exist to generate digital artwork on different user devices. Generally, these applications allow a user to draw, sketch, and/or paint on a digital canvas with digital approximations of physical tools. For example, the user chooses a pencil tool and sees the digital approximation of graphite, or chooses a paintbrush tool and sees the digital equivalent of acrylic paint. Each of the art tools has distinct properties associated with it. The properties of an art tool include, for example, the size, opacity, color, and blend mode of a projected end of the art tool, such as a graphite tip of the pencil tool or a brush stroke of the brush tool.

Setting the values of the properties (e.g., the size of a brush to use) commonly takes the form of a slider mechanism. The user selects one property at a time and invokes the slider mechanism via a menu selection. The slider mechanism is presented in a window. The user drags a handle back and forth inside a track of the slider mechanism to change the value of the selected property (e.g., to increase or decrease the size).

The slider mechanism and, more generally, the existing artwork applications provide limited information to the user about what the application of the art tool on the digital canvas will look like until the actual application. For example, the slider mechanism displays a numerical value of the property in the window but does not preview what the projected end of the art tool at that property (e.g., the size of the brush) truly looks like on the digital canvas next to or over already created artwork. In addition, the window of the slider mechanism is typically dissociated from the digital canvas (e.g., the window is a popover window that obstructs the digital canvas or that is presented outside the boundaries of the digital canvas). Thus, to set the property to a desired value (e.g., one that matches or complements the already created artwork), the user has to go back and forth between the slider mechanism and the digital canvas in a trial and error approach.

This trial and error approach becomes even more problematic when multiple properties (e.g., the size and opacity of the brush) need to be adjusted. Because the slider mechanism allows a one-at-a-time selection of a property, the user can only adjust the multiple properties in a sequential order. Thus, the trial and error approach is repeated multiple times. For example, the user iteratively adjusts the size of the brush through back and forth adjustments between the slider mechanism and the digital canvas. Then, the user iteratively adjusts the opacity in a similar fashion. If for some reason, a conflict exists between the adjusted size and opacity, the entire adjustment process is repeated.

SUMMARY

One exemplary embodiment involves improving a user interface (UI) of an artwork application. For example, a user operates a user device to run the artwork application. The artwork application is configured to compose digital artwork based on user interactions received via a user interface of the user device. The digital artwork is composed on a digital canvas through an art tool (e.g., a pencil tool, a brush tool, an eraser tool, etc.) applied to the digital canvas. The art tool has multiple properties (e.g., size, opacity, color, etc.). The artwork application supports a user interaction for selecting multiple properties. In response to a selection, the artwork application generates and presents a UI preview element on the digital canvas. In an example, the UI preview element previews values of the selected properties in a one-to-one ratio on the digital canvas. A one-to-one preview of a property value includes presenting, on the digital canvas, what that property actually looks like if the art tool is applied to the digital canvas. For instance, a one-to-one preview of a size of a pencil tool presents how the actual size of the graphite tip of the pencil tool will actually appear on the digital canvas. In this illustration, the UI preview element, when presented on the digital canvas, includes a tip of the pencil with surrounding content of the digital canvas. The tip is projected on the digital canvas based on the size. The content surrounds the projected tip. The artwork application receives a user manipulation of the UI preview element, such as a movement of the UI preview element along a certain direction over the digital canvas. The manipulation corresponds to adjusting the values of the selected properties. The artwork application sets the values of the selected properties according to the manipulation. Thereafter, the art tool is usable to generate or delete a portion of the digital artwork on or from the digital canvas according to the set values. Such an artwork application provides many benefits. The benefits include, for example, adjusting multiple properties at the same time and previewing each of the respective property values in a one-to-one ratio on the digital canvas, thereby eliminating the trial and error approach of the existing artwork applications.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
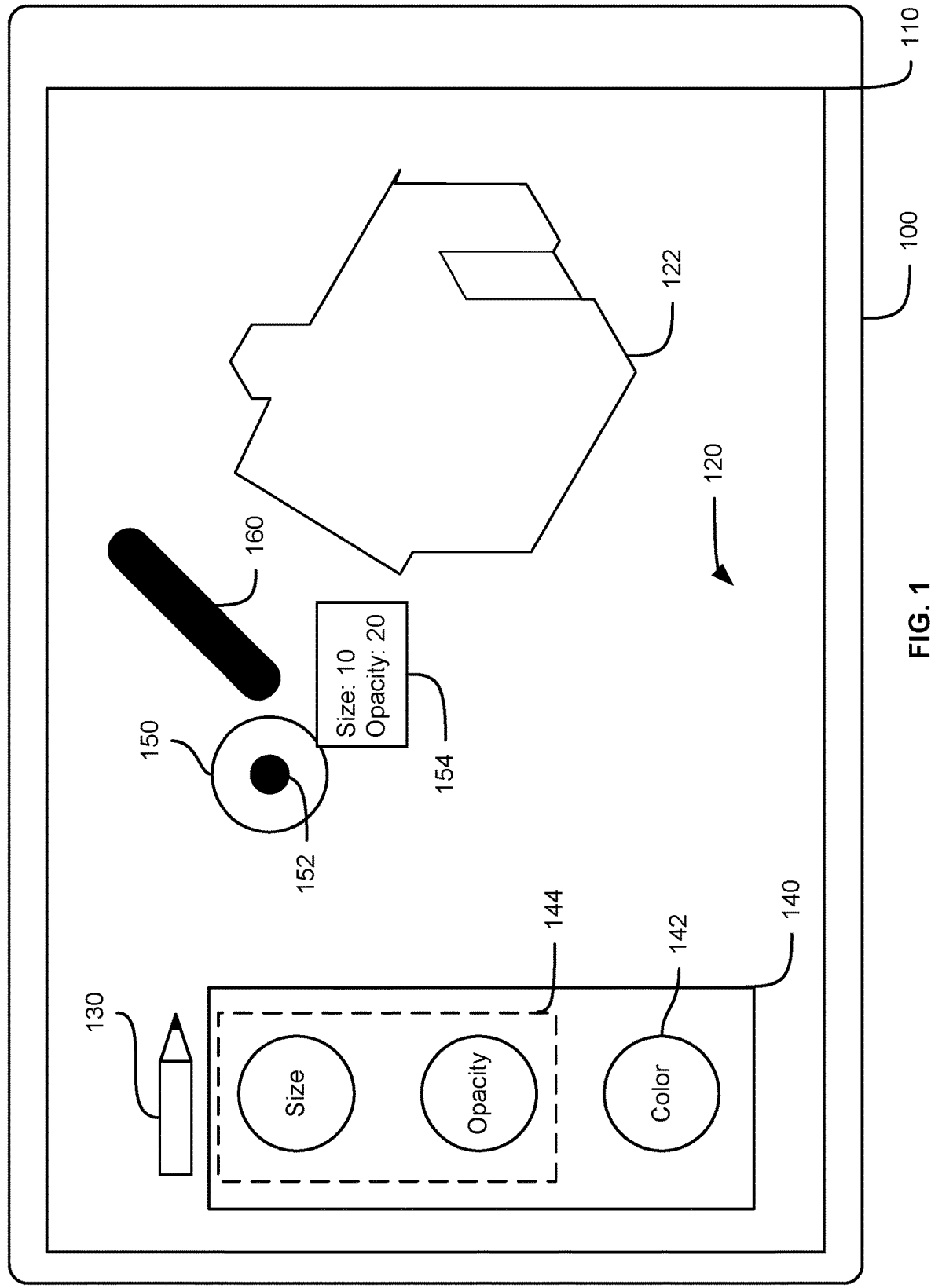
FIG. 1 illustrates an example of a user interface (UI) that includes a UI preview element presented over a digital canvas, according to certain embodiments of the present invention.

Specific details of various exemplary embodiments of the present invention are set forth in the following description and are illustrated in FIGS. 1-11. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, improving a user interface (UI) of an application configured to generate (e.g., compose, create, edit, delete, etc.) digital artwork. The application is running on a user device and presents a digital canvas, an art tool, and a menu on the UI. In turn, the menu presents variable properties of the art tool, such as size, opacity, color, blend mode and is usable to specify values of such properties. A user operates the user device to select two or more properties from the menu via a user interaction (e.g., a gesture on a touchscreen of the user device or a set of clicks through a mouse of the user device). The application generates a UI preview element on the digital canvas. The UI preview element previews values of the selected properties on the digital canvas. Previewing a value of a property includes a one-to-one ratio preview, where the property is presented on the digital canvas at that value. In other words, the one-to-one ratio preview of the value previews what the property of the art tool will actually look like when the art tool is applied to the digital canvas. In an example, the UI preview element provides the one-to-one ratio preview by including an end of the art tool and, as applicable, content of the digital canvas. The end of the art tool is projected on the digital canvas based on at least one or all of the previewed values. The content surrounds the end of the art tool as projected on the digital canvas. As such, the UI preview element previews the end of the art tool surrounded by the content such that the appearance of the end of the art tool is previewed based on the values of the properties A user interaction with the UI element is received. For example, the user operates the user device to position the UI element on top or near an already created portion of digital artwork or over a blank space of the digital canvas. The user also operates the device to move the UI element according to a certain pattern. Based on this user interaction including the pattern, the values of the different selected properties are adjusted and previewed live on the digital canvas. The user is then able to select particular values that are being previewed (e.g., by stopping the movement of the UI element). The application adjusts the selected properties based on these values. The user operates the user device to use the art tool with the adjusted properties and create, edit, or delete digital artwork on the digital canvas.

As used herein, the term "application" refers to any program instructions or other functional components that execute on a device. In an example, the application resides in the memory of a device that executes the application. As is known to one of skill in the art, such applications reside in any suitable computer-readable medium and execute on any suitable processor. The term "artwork application" refers to an application configured to generate digital artwork. In an example, a user operates a user device to run the artwork application and generate the digital artwork. The term "digital artwork" refers to artwork that has a digital form. In an example, the digital artwork is generated by an artwork application and is stored as a digital file at a storage location of a user device, a server, or a network. The term "digital canvas" refers to a UI area of an artwork application, where the UI area allows generating, editing, or deletion of digital artwork. In an example, a user operates a user device to run an artwork application, access the digital canvas, and generate, edit, or delete digital artwork on or from the digital canvas. The term "art tool" represents a tool that, when applied on a digital canvas, generates, edits, or deletes a portion of digital artwork. In an example, a user operates a user device to run an artwork application and use an art tool to draw, paint, or sketch over a digital canvas. A pencil tool, a brush tool, a marker tool, a filler tool, and an eraser tool are examples of an art tool. The term "preview element" refers to an element configured for presentation on a digital canvas to preview properties of an art tool. In an example, the preview element is presented on a user interface. In this example, the preview element is also referred to as a "UI preview element." The term "one-to-one ratio preview of a property of an art tool" refers to previewing on a digital canvas what the property will actually look like when the art tool is applied to the digital canvas. This includes, for example, previewing the appearance of an end tool of the art tool given the property or, more specifically, given the value of the property.

To illustrate, consider an example of drawing an object on a digital canvas using a pencil tool of an artwork application. In this example, the user operates a tablet and desires to increase the size and opacity of the graphite tip of the pencil tool. The artwork application presents a menu listing the different properties of the pencil tool. Through a gesture on the touchscreen of the tablet (e.g., a select, hold, and release), the user selects the size and opacity properties. In response, the artwork application generates and presents a UI preview element having a circular shape. Within that shape, the graphite tip of the pencil tool is replicated and presented at the current size and opacity values. Through another gesture on the touchscreen (e.g., a right ascending diagonal swipe) that moves the UI element, the size and opacity of the graphite tip replica within the UI element is increased. As the gesture is performed, the changes (e.g., respective increases) to the size and opacity properties are previewed with one-to-one ratio on the digital canvas. For example, the size is increased proportionally to the movement of the UI preview element, and the increase is previewed within the UI preview element on the digital canvas. Similarly, the opacity is darkened (or rendered less transparent) proportionally to the movement of the UI preview element, and the darkening is previewed within the UI preview element on the digital canvas. Upon the end of this gesture, the values of the size and opacity properties are increased according to the total movement of the UI preview element. From that point on, the user applies other gestures on the touchscreen to draw on the canvas digitally using the pencil tool at the increased size and opacity.

Unlike existing artwork applications, no slider mechanism in a disassociated window is used. Instead, a UI preview element is implemented and provides several benefits. The UI preview element is presented live on the digital canvas, replicates a projected end of an art tool, allows simultaneous adjustments of multiple properties of the art tool, and previews what these properties will actually look like on the digital canvas when the art tool is used. Thus, the trial and error approach can be eliminated. In addition, the UI preview element can be positioned over or near an existing object (or portion) of digital artwork. This positioning improves the property adjustment because the object can be matched in a better way based on the proximity of the UI preview element to the object.

Turning to FIG. 1, the figures illustrates an example user interface of an artwork application that implements a UI preview element. A user device 100 runs the artwork application. In an example, the user device 100 includes a tablet having a touchscreen. Gestures of the user of the user device 100 are received at the touchscreen and used to operate the artwork application. However, the embodiments described herein are not limited to a tablet or a touchscreen. Instead, other types of the user device 100 and input interface can be used, including a desktop, a laptop, a personal computer, a smartphone, or other devices and a mouse, a keyboard, and other input interfaces. Generally, any user input, whether a gesture, a mouse click, a keyboard push, or other user inputs, is translated into an operation. An example of the user device 100 is further illustrated in FIG. 9.

The user device 100 provides a user interface 110 for presenting components of the artwork application. In an example, the user interface 110 displays a digital canvas 120, an art tool 130, and a menu 140. Through gestures on the touchscreen, the user applies the art tool 130 to draw, paint, or sketch an object 122 on the digital canvas.

In an example, the menu 140 lists different properties 142 of the art tool 130 including, for example, size, opacity, and color. The menu 140 also allows the user to switch between different types of the art tool 130 (e.g., to select between a pencil tool, a brush tool, an eraser too, etc.). In addition, the menu 140 can be user-activated. For instance, based on a user gesture, the menu 140 is presented at the user interface 140. Based on another user gesture, the menu 140 is hidden.

A set 144 of the properties presented on the menu 140 is simultaneously selectable. For example, a user gesture (e.g., a tap and hold over each property) results in selecting the set of properties 144 (e.g., the size and opacity, but not the color, all three, or other property combinations).

Once the set 144 is selected, the artwork application presents a UI preview element 150 on the digital canvas 120. The UI preview element 150 is moveable across the digital canvas. For instance, a user gesture (e.g., a swipe) results in positioning the UI preview element 150 next to the object 122. The UI preview element 150 is configured to preview the selected properties of the set 144 and to adjust the values of these properties based on movement of the UI preview element 150 (e.g., through a user gesture corresponding to the movement).

Generally, the UI preview element 150 has a shape. FIG. 1 illustrates a circular shape. Other simple or complex geometric shapes can also be used, such as a square, triangle, etc. In an example, the shape replicates the shape used to present the properties 142 in the menu 142. In another example, the shape is common to some or all of the art tools (e.g., a circular shape is used for both a pencil tool and a brush tool). In yet another example, the shape depends on the art tool. In this example, the shape can replicate or proximate a projected end of the art tool, where the projected end is the end of the tool that is applied to the digital canvas 120. For instance, the shape corresponding to a graphite tip of a pencil tool is circular with a well-defined outer boundary. In comparison, the shape corresponding to a brush stroke is more rectangular with a loosely defined outer boundary.

The UI preview element 150 previews the set 144 of selected properties in a combination of ways. In an example, the UI preview element 150 includes a representation 152 (e.g., a replica, approximation, or generic shape) of the projected end of the art tool 130. The representation 152 is previewed within the UI preview element 150 in a one-to-one ratio on the digital canvas 152. In other words, if the selected properties are set given the representation 152, the projected end of the art tool 130 will have those same properties as previewed by the representation 152 when the art tool 130 is applied to the digital canvas 120. The one-to-one ratio preview includes presenting, within the UI preview element 150, the representation 152 and, as applicable, surrounding content of the digital canvas 120. The representation 152 is presented given the selected properties. The content surrounds the representation 152 and spans a region of the digital canvas centered between an outer boundary of the presented representation 152 and an inner boundary of the UI preview element 150. In addition, the UI preview element 150 optionally includes numerical values 154 of the selected properties. The numerical values 154 provide a complimentary and different type of preview of the selected properties.

As illustrated in FIG. 1, the representation 152 also has a shape. In an example, the shape replicates the shape of the UI preview element 150 (e.g., is circular when the UI preview element 150 is circular). In another example, the shape replicates the shape of the projected end of the art tool 130 (e.g., a circular shape with a well-defined outer boundary for a pencil tool, and a more rectangular shape with a loosely defined outer boundary for a brush tool).

Through a user gesture, the user moves the UI preview element 150 within the digital canvas 120. As the UI preview element 150 is moved, the representation 152 is updated to preview changes to the selected properties in a one-to-one ratio on the digital canvas 120. If also presented, the numerical values 154 are similarly updated. At the end of the gesture, the values of the selected properties are set based on the movement of the UI preview element 150.

Thereafter, the user applies the art tool 130 to draw, for example, a new object 160. The new object 160 is drawn using the set properties.

Hence, by operating the artwork application, the user interface 110 to generate, edit, or delete digital artwork is improved. In particular, multiple properties of an art tool are simultaneously adjusted using the UI preview element 150. In addition, the adjustments are previewed using one-to-one ratios in a live manner on the digital canvas 120. Further, the UI preview element 150 can be positioned next to the object 150 to better approximate the property adjustments.

Figure 2:
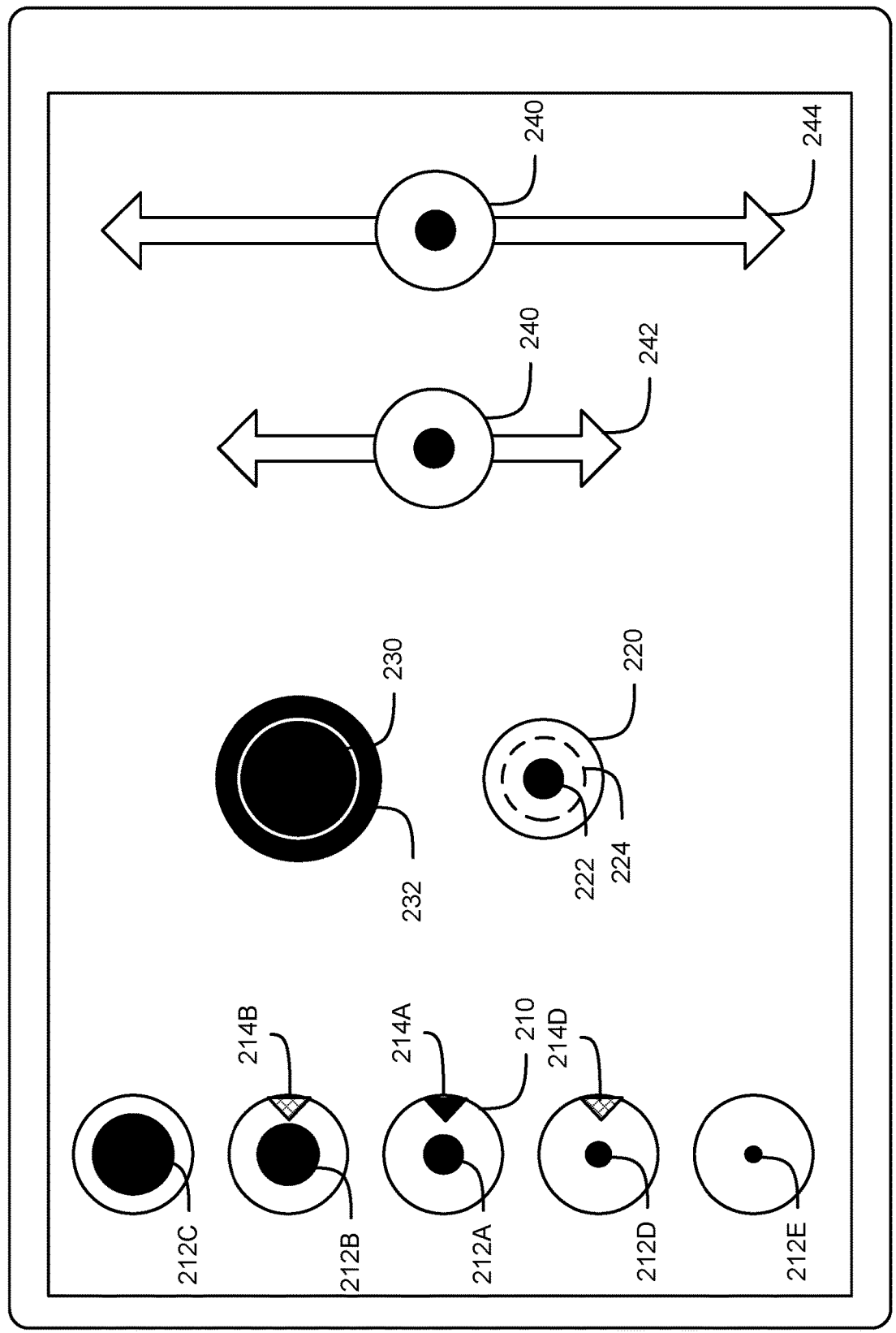
FIG. 2 illustrates example information previewed within a UI preview element, according to certain embodiments of the present invention.

Turning to FIG. 2, the figure illustrates different types of information previewed by a UI preview element, such as the UI preview element 150. A first type of example information includes previewing a default value and is illustrated on the left hand side of FIG. 2. A second type of example information includes previewing a range of sizes and is illustrated in the middle of FIG. 2. In addition, FIG. 2 illustrates on the right hand side an adjustment of a resolution of a UI preview element. These features are described in more detail herein next.

As illustrated on the left hand side of FIG. 2, a UI preview element 210 is presented on a digital canvas at a user interface. A user gesture (e.g., a swipe) moves the UI preview element 210 along a certain direction (e.g., the vertical direction as shown in FIG. 2). A representation 212 of selected properties is presented within the UI preview element 210. Generally, the gesture adjusts the values of the properties. In the interest of clarity of explanation, a gesture to adjust a size property is used to describe the illustration of FIG. 2. However, multi-dimensional gestures are similarly applicable and are further described in FIGS. 4-8.

Moving the UI preview element 210 in one direction (e.g., upwards) increases the size. Moving the UI preview element 210 in the other direction (e.g., downwards) decreases the size. As illustrated in FIG. 2, regardless of the movement, the general dimension of the UI preview element 210 (e.g., of the outer circular) does not change. Only the dimension of the representation 212 within the UI preview element 212 changes. However, the UI preview element 210 is repositioned according to the movement (e.g., an upwards movement positions the UI preview element 210 at an upward position).

As illustrated, the UI preview element 210 is first presented at a center position "A." The representation 212 (shown as 212A at the center position "A") has a default dimension at that center position.

The UI preview element 210 is moved to a first upward position "B." This movement proportionally increases the dimension of the representation 212 (shown as 212B at the first upward position "B"). Thus, the UI preview element 210 previews the representation 212 with a larger proportional dimension.

The UI preview element 210 is moved to a first upward position "B." This movement proportionally increases the dimension of the representation 212 (shown as 212B at the first upward position "B"). Thus, the UI preview element 210 previews the representation 212B with a larger proportional dimension.

The UI preview element 210 is moved to a second and farther upward position "C." This movement proportionally increases the dimension of the representation 212 (shown as 212C at the second upward position "C"). Thus, the UI preview element 210 previews the representation 212C with even a larger proportional dimension.

In the opposite direction, the UI preview element 210 is moved to a first downward position "D." This movement proportionally decreases the dimension of the representation 212 (shown as 212D at the first downward position "D"). Thus, the UI preview element 210 previews the representation 212D with a smaller proportional dimension.

The UI preview element 210 is moved to a second farther downward position "E." This movement proportionally decreases the dimension of the representation 212 (shown as 212E at the second downward position "D"). Thus, the UI preview element 210 previews the representation 212E with even a smaller proportional dimension.

Each of the dimensions of the representation 212 is previewed with a one-to-one ratio that presents the actual respective size on the digital canvas. Each of the previewed sizes correspond to a size value. In addition to previewing a size, the UI preview element 210 also previews a relativity (e.g., how close) of the size to a default value of the size. For example, the UI preview element 210 includes an indicator 214 of the relativity.

As described herein above, at the center position "A," the representation 212A is shown with a default dimension. That default dimension corresponds to the default value of the size. As such, at the center position "A," the UI preview element 210 presents the indicator 214 (shown as 214A) with a default format (e.g., a triangle with a solid color, or some other graphical shape or presentation format).

In comparison, at the first upward position "B," the size value is no longer the default value. Instead, the size has increased by a certain amount (e.g., proportional to the movement to that position "B"). Accordingly, the UI preview element 210 presents the indicator 214 (shown as 214B) with an updated format (e.g., a triangle with a faded color, or some other graphical shape or presentation format). Similarly, at the first downward position "D," the UI preview element 210 presents the indicator 214 (shown as 214D) with an updated format (e.g., a triangle with a faded color, or some other graphical shape or presentation format).

However, at the positions "C" or "E," the difference between the size value and the default value exceeds a threshold indicating that the size is far enough from the default value. Accordingly, the UI preview element 210 no longer presents the indicator 214 at these positions.

In an example, a mapping of the indicator's 214 presentation format to the difference between the size value and the default value is stored and is accessible to the artwork application. The artwork application adjusts the presentation of the indicator 214 based on the mapping.

The use of the indicator 214 allows the user to get a quick visual apprehension of how far off the size value is from the default value. The further out, the less expressed (or even present) the indicator 214 is. The closer, the more expressed (e.g., the opacity of the indicator 214 becomes darker) the indicator 214 is. Thus, by swiping the UI preview element 210 in a certain direction, the user can quickly assess how close the gesture is to setting the size to the default value or not.

As illustrated in the middle of FIG. 2, a UI preview element 220 and a UI preview element 230 are presented on the digital canvas. The two elements 220 and 230 provide information about a range for the size property (and similarly to any other property). That information is useful to the user when the UI preview element 220 is used for different art tools. The range includes an upper limit and a lower limit on the size property. The UI preview elements 220 and 230 can be the same as the UI preview element 210. However, in the interest of clarity of explanation, the three elements 210-230 are illustrated separately.

The UI preview element 220 has a shape bounded by a boundary. From the perspective of the user, the UI preview element 220 is usable across multiple art tools. One of the art tools (e.g., a pencil tool) has a projected end (e.g., a graphite tip) that, in turn, has a maximum size. That maximum size is relatively smaller than the boundary. The UI preview element 220 allows the user to quickly determine that the maximum size of this particular art tool will not exceed the boundary of the UI preview element 220, even when the UI preview element is swiped upward for a great distance. Thus, the user can quickly assess the resolution of the gesture.

As illustrated, the UI preview element 220 includes a representation 222 that previews the size property for the particular art tool. The UI preview element 220 also includes an inner boundary 224 (illustrated as a circular boundary that replicates the shape of the UI preview element 220). The inner boundary 224 indicates the upper limit of the size property (e.g., when the UI preview element 220 is swiped upward, that maximum size will not be exceeded as indicated by the inner boundary 224). A similar boundary can be used for indicating the lower limit of the size property.

In comparison, the UI preview element 230 also has a shape bounded by a boundary. From the perspective of the user, the UI preview element 230 is usable across multiple art tools. One of the art tools (e.g., a brush tool) has a projected end (e.g., a brush stroke) that, in turn, has a maximum size. That maximum size is relatively larger than the boundary. The UI preview element 220 allows the user to quickly determine that the maximum size of this particular art tool can exceed the boundary of the UI preview element 230. Thus, the user can quickly assess the resolution of the gesture.

As illustrated, the UI preview element 230 includes a representation 232 that previews the size property for the particular art tool. When the UI preview element 230 is swiped upward (or using a proper gesture to increase the size property), the boundary representation 232 exceeds the boundary of the UI preview element 230 indicating that the relatively larger maximum size of the particular art tool.

As illustrated on the right hand side of FIG. 2, a gesture is used to adjust a resolution of a UI preview element 240. The resolution represents the sensitivity of moving the UI preview element 240 relative to previewing and adjusting a size property (or any other property). As described hereinabove, some art tools have a maximum size that is relatively small. For these art tools, the user experience is improved by changing the resolution to increase the sensitivity. For instance, rather than swiping the UI preview element 240 for one inch on the touchscreen to maximize the size property from the default value (the one inch being a current resolution), the resolution is updated to use two inches. Based on this update, the swipe needs to cover two inches to adjust the size property to the maximum value, thereby providing additional user control to more accurately and precisely adjust the size property to a value in between the default and the maximum.

In an example, the gesture includes a scrubbing gesture that moves the UI element 240 back and forth along a direction (e.g., the vertical direction). Initially, a resolution 242 of the UI preview element 240 is applicable. As illustrated in FIG. 2, the resolution 242 covers a certain dimension (e.g., pixel distance). Upon applying the gesture, the resolution is updated (show as a resolution 244). The updated resolution 244 covers a larger dimension.

Hence, a UI preview element previews different properties of an art tool. In addition, the UI preview element presents information about the properties, including default values and a range of values. The resolution of the UI preview element is also modifiable to adjust for sensitivity and enhance user control.

Figure 3:
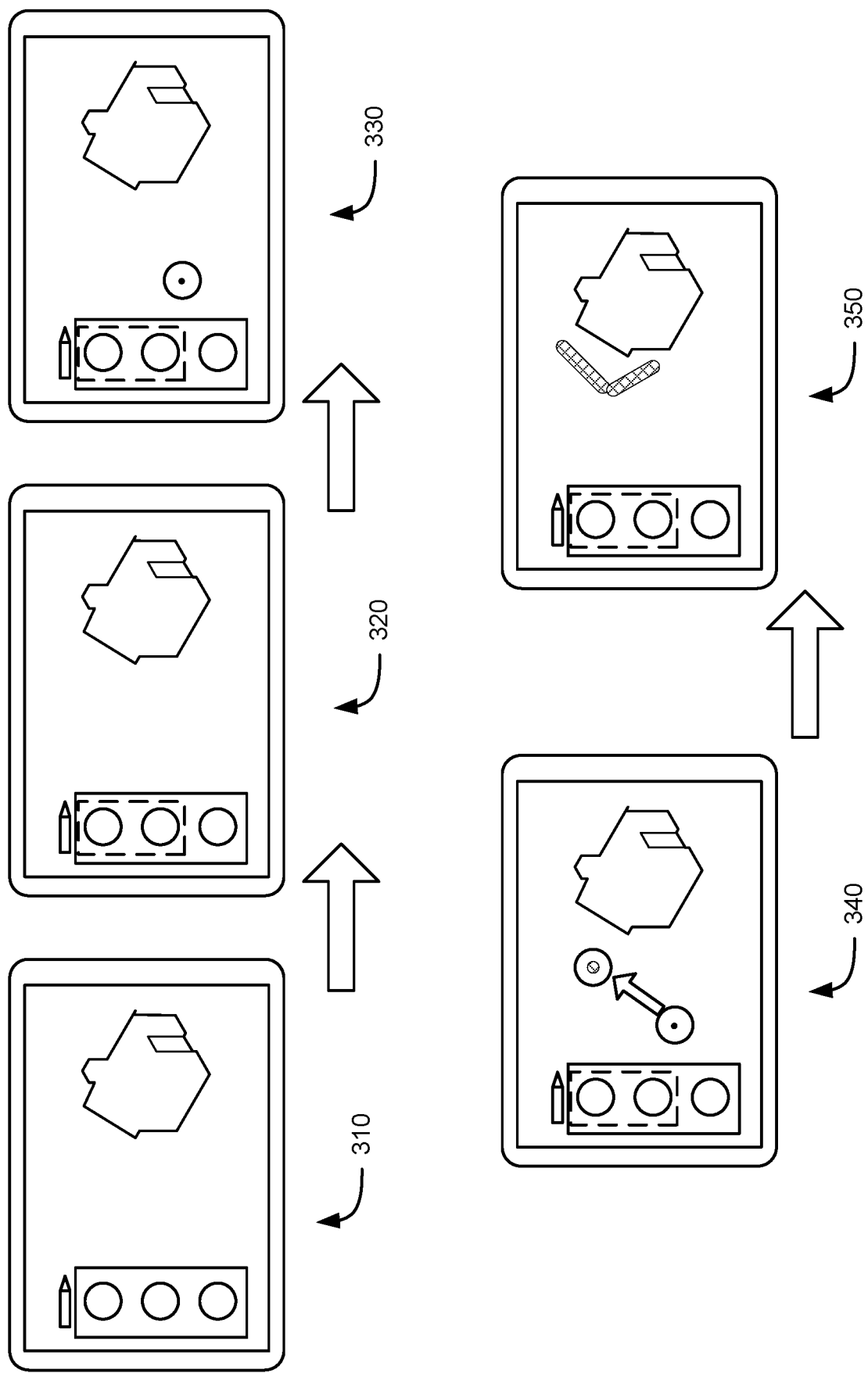
FIG. 3 illustrates an example of using a UI preview element to adjust properties of an art tool, according to certain embodiments of the present invention.

FIG. 3 illustrates an example of using a UI preview element to generate an object on a digital canvas. In particular, a user operates a user device to run an artwork application. The artwork application presents a digital canvas, an art tool, and a menu at a user interface. The user provides different gestures to apply the art tool to generate an object on the digital canvas, as shown on a UI 310.

The user desires to create a second object in proximity of the first object. A different size and opacity of the projected end of the art tool is desired for this object. Accordingly, the user provides a gesture (e.g., a tap and hold) to select those two properties, as shown on a UI 320. Once the gesture is complete and the properties are selected, the artwork application presents a UI preview element on the digital canvas, as illustrated on a UI 330. The UI preview element previews the two properties at respective current values (e.g., as set and used to generate the first object).

The user provides another gesture (e.g., a swipe) to increase the size and the opacity. The artwork application moves the UI preview element to follow the swipe, and updates the UI preview element as being moved to preview the changes to the size and the opacity using a one-to-one ratio on the digital canvas, as shown on a UI 340. Satisfied with particular size and opacity increases, the user stops the gesture. The artwork application updates the size and opacity according to the particular increases, as illustrated on the UI 340. Thereafter, the user provides gestures (e.g., swipes) that apply the art tool to the digital canvas, thereby generating the second object with the updated size and opacity of the art tool, as shown on a UI 350.

As described herein above, a UI preview element simultaneously previews multiple properties of an art tool and facilitates simultaneous adjustments to these properties. FIGS. 4-8 illustrate example of multi-dimensional gestures that take advantage of the simultaneous preview of properties to control the simultaneous property adjustments.

Figure 4:
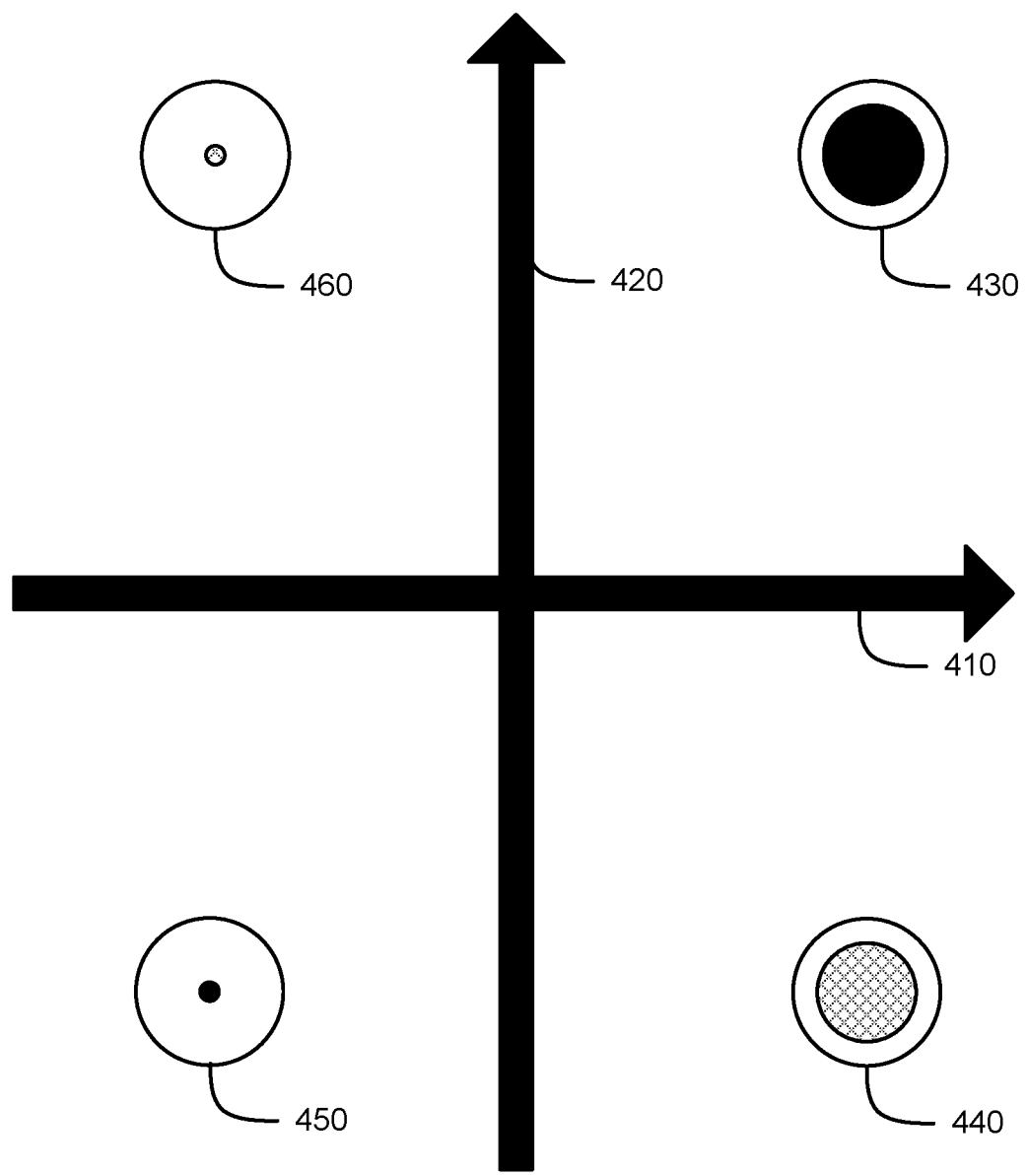
FIG. 4 illustrates an example two-dimensional user action associated with using the UI preview element to adjust properties, according to certain embodiments of the present invention.

Turning to FIG. 4, the figure illustrates an example two-dimensional gesture. In particular, the two-dimensional gesture is mapped to a two dimensional coordinate system that includes a first axis 410 (e.g., a horizontal axis) and a second axis 420 (e.g., a vertical axis). A property (e.g., a size) is mapped to the first axis 410. A second property (e.g., opacity) is mapped to the second axis 420. Moving a UI preview element through various quadrants of this system results in different previews and adjustments of the two properties.

In an example, moving the UI preview element along one direction of the first axis 410 (e.g., a left to right movement on the horizontal axis) results in an increase to the first property (e.g., a size increase). Moving the UI preview element in the opposite direction on the first axis 410 results in a decrease to the first property.

Similarly, moving the UI preview element along one direction of the second axis 420 (e.g., an upward movement on the vertical axis) results in an increase to the second property (e.g., an opacity increase). Moving the UI preview element in the opposite direction on the second axis 420 results in a decrease to the second property.

FIG. 4 illustrates the combination of these movements. The dimension of the inner circle of the UI preview element corresponds to the first property (e.g., the size). The texture of the UI preview element corresponds to the second property (e.g., the opacity).

Moving the UI preview element in an ascending right diagonal results in an increase to both properties (shown with UI preview element 430, where the inner circle's dimension is increased and the texture becomes solid). Moving the UI preview element in a descending right diagonal results in an increase to the first property and a decrease to the second property (shown with UI preview element 440, where the inner circle's dimension is increased and the texture becomes more transparent). Moving the UI preview element in a descending left diagonal results in a decrease to both properties (shown with UI preview element 450, where the inner circle's dimension is decreases and the texture becomes more transparent). Moving the UI preview element in an ascending left diagonal results in a decrease to the first property and an increase to the second property (shown with UI preview element 460, where the inner circle's dimension is decreased and the texture becomes solid).

Figure 5:
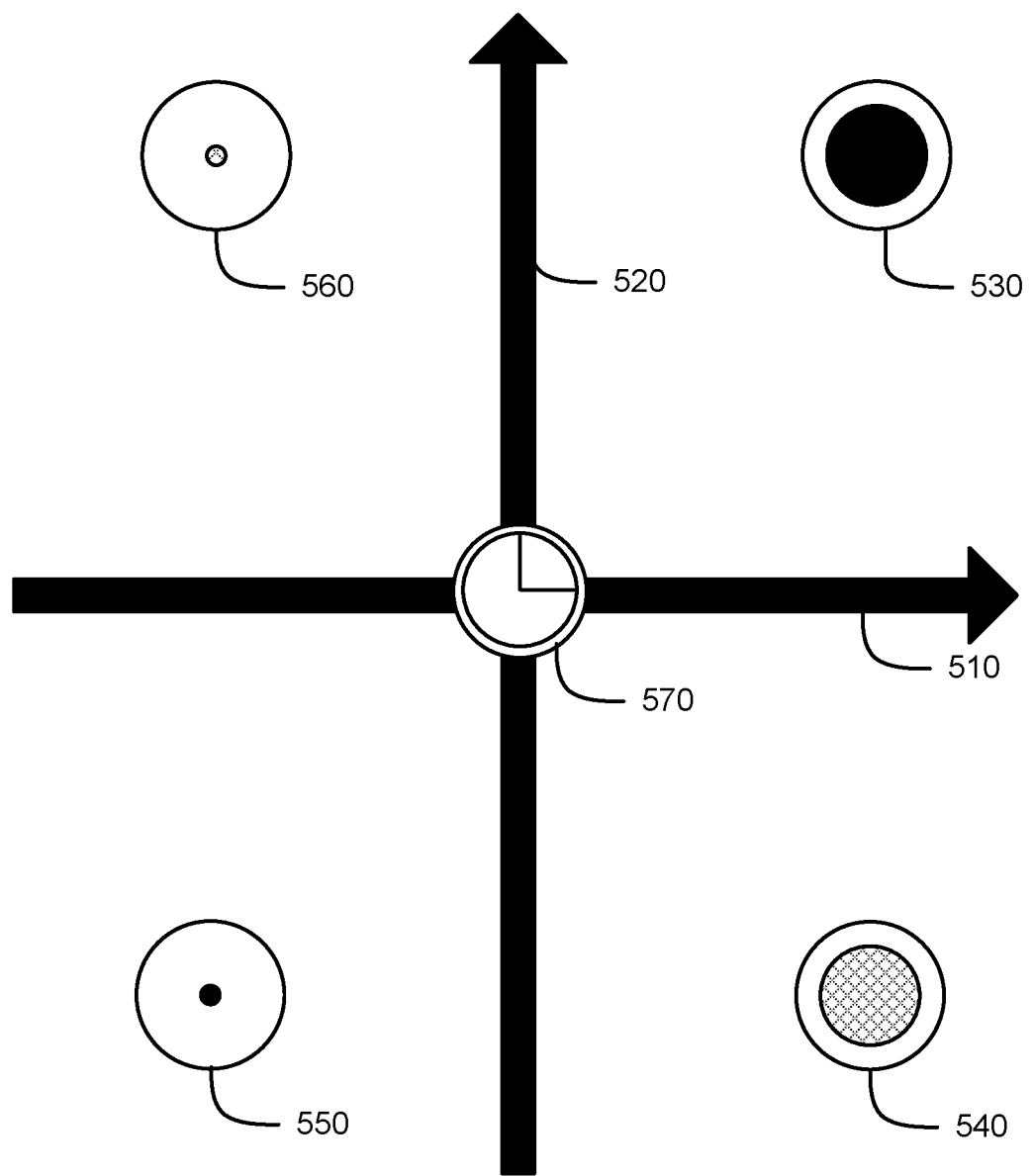
FIG. 5 illustrates an example three-dimensional user action associated with using the UI preview element to adjust properties, according to certain embodiments of the present invention.

Turning to FIG. 5, the figure illustrates an example three-dimensional gesture. The three dimensional-gesture is an extension of the two-dimensional gesture of FIG. 4. In particular, a similar two dimensional coordinate system is used, including a first axis 510 and a second axis 520 that are mapped to a first property and a second property, respectively. In addition, a third dimension 570 is used, such as a time or a pressure dimension. That third dimension 570 can be referred to as a translational dimension and is mapped to a third property. For example, the longer the gesture is held or the more pressure the gesture includes, the larger the change to the third property is. In an illustration, the third property is color. The longer the hold or the larger the pressure, the darker the color becomes (or the color changes according to a predefined order of a color wheel or following an ascending order of RGB values).

As illustrated in FIG. 5, moving the UI preview element in an ascending right diagonal results in an increase to first and second properties (shown with UI preview element 530). Moving the UI preview element in a descending right diagonal results in an increase to the first property and a decrease to the second property (shown with UI preview element 540). Moving the UI preview element in a descending left diagonal results in a decrease to the first and second properties (shown with UI preview element 550). Moving the UI preview element in an ascending left diagonal results in a decrease to the first property and an increase to the second property (shown with UI preview element 560). In each of these positions (e.g., top right, bottom right, bottom left, and top left), or at some point during the gesture such as at the beginning of the gesture, the longer the gesture is held or the more pressure is applied through the gesture, the larger the increase to the third property is.

Figure 6:
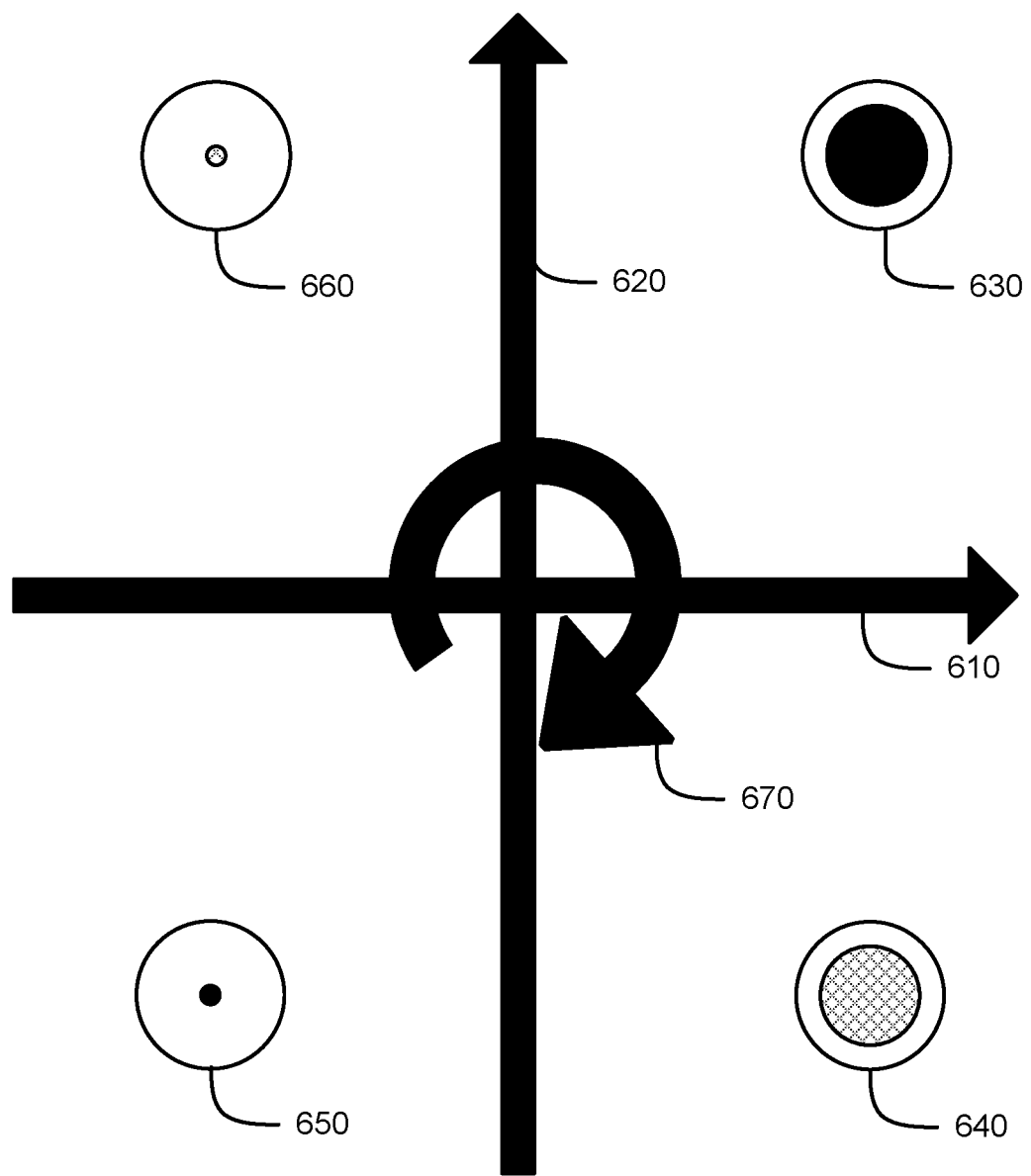
FIG. 6 illustrates another example three-dimensional user action associated with using the UI preview element to adjust properties, according to certain embodiments of the present invention.

Turning to FIG. 6, the figure illustrates another example three-dimensional gesture. A three-dimensional gesture similar to that of FIG. 5 is used. Here, however, rather than using a time or pressure dimension, a rotational axis is used for the third dimension 670. Providing a rotation in one direction (e.g., clockwise) changes the third property (e.g., changes the color in one way). Providing a rotation in the other direction (e.g., counter clockwise) changes the third property in the opposite way.

As illustrated in FIG. 6, moving the UI preview element in an ascending right diagonal results in an increase to first and second properties (shown with UI preview element 630). Moving the UI preview element in a descending right diagonal results in an increase to the first property and a decrease to the second property (shown with UI preview element 640. Moving the UI preview element in a descending left diagonal results in a decrease to the first and second properties (shown with UI preview element 650). Moving the UI preview element in an ascending left diagonal results in a decrease to the first property and an increase to the second property (shown with UI preview element 660). In each of these positions (e.g., top right, bottom right, bottom left, and top left), or at some point during the gesture such as at the beginning of the gesture, the applied rotational movement changes the third property.

Figure 7:
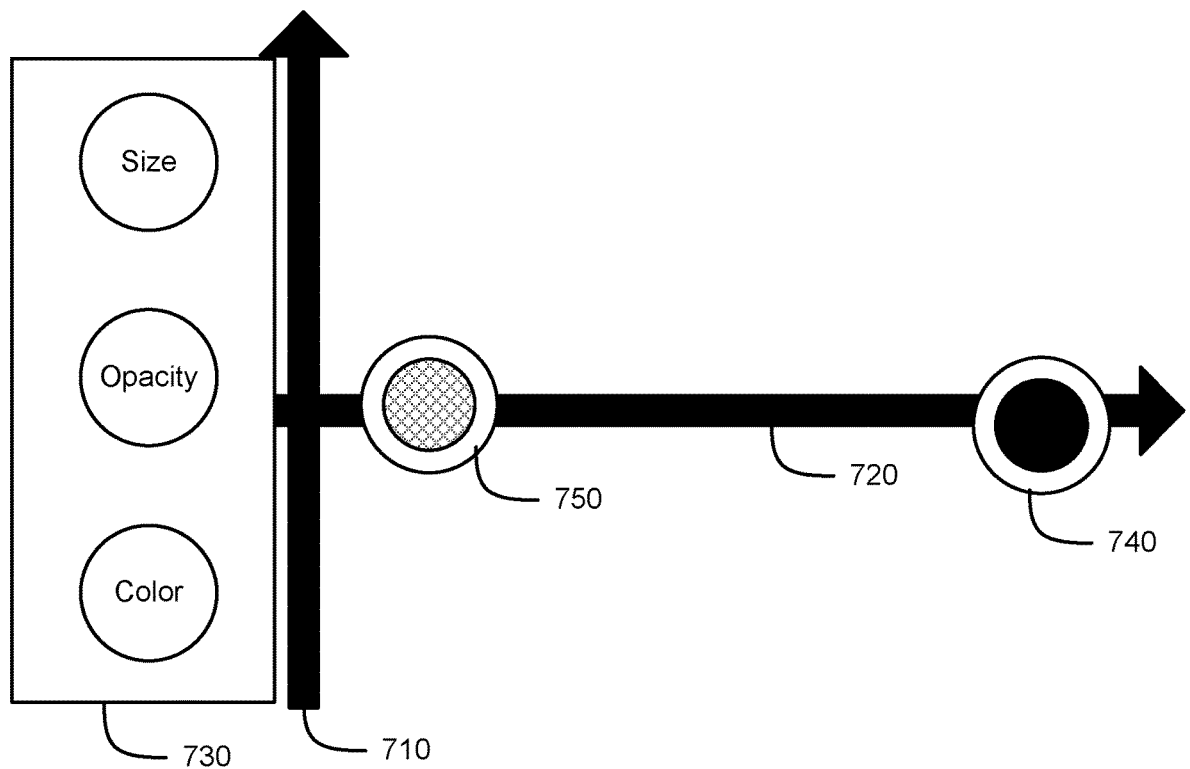
FIG. 7 illustrates another example two-dimensional user action associated with using the UI preview element to adjust properties, according to certain embodiments of the present invention.

Turning to FIG. 7, the figure illustrates another example of a two-dimensional gesture. While FIG. 4 illustrates adjusting two properties along two respective directions, FIG. 7 illustrates an activation of a selected property along a first direction 710 and an adjustment to the activated property along a second direction 720.

In an example, selected properties 730 are displayed in a menu along a direction that follow the first direction 710. FIG. 7 illustrates three selected properties 730, displayed using a vertical order: size at the top, opacity in the middle, and color at the bottom. Moving a UI preview element along that first direction 710 to a point parallel to a particular of these selected properties 730 causes that particular property to be selected. As illustrated in FIG. 7, the UI preview element is parallel the opacity property, thereby activating that property. Similarly, if the UI preview element is moved upwards to become parallel to the size property or downwards to become parallel to the color property, each of these two properties are activated respectively.

The second direction 720 is used to adjust the activated property. In particular, by moving the UI preview element along the second direction 720, the property changes. For example, moving the UI preview element to the right increases a value of the property. Moving the preview element to the left decreases the value.

As illustrated in FIG. 7, the opacity property is activated by moving the UI preview element to become parallel to the opacity displayed in the menu. Moving the UI preview element to the right increases the opacity value (shown as UI preview element 740 with a solid inner circle). Moving the UI preview element to the left decreases the opacity value (shown as UI preview element 750 with a textured inner circle).

Similar adjustments to the other selected properties are possible. For example, moving the UI preview element upward along the first direction 710 to become parallel to the size property activates the size property. Moving the UI preview element along the second direction 720 adjusts the size property.

Figure 8:
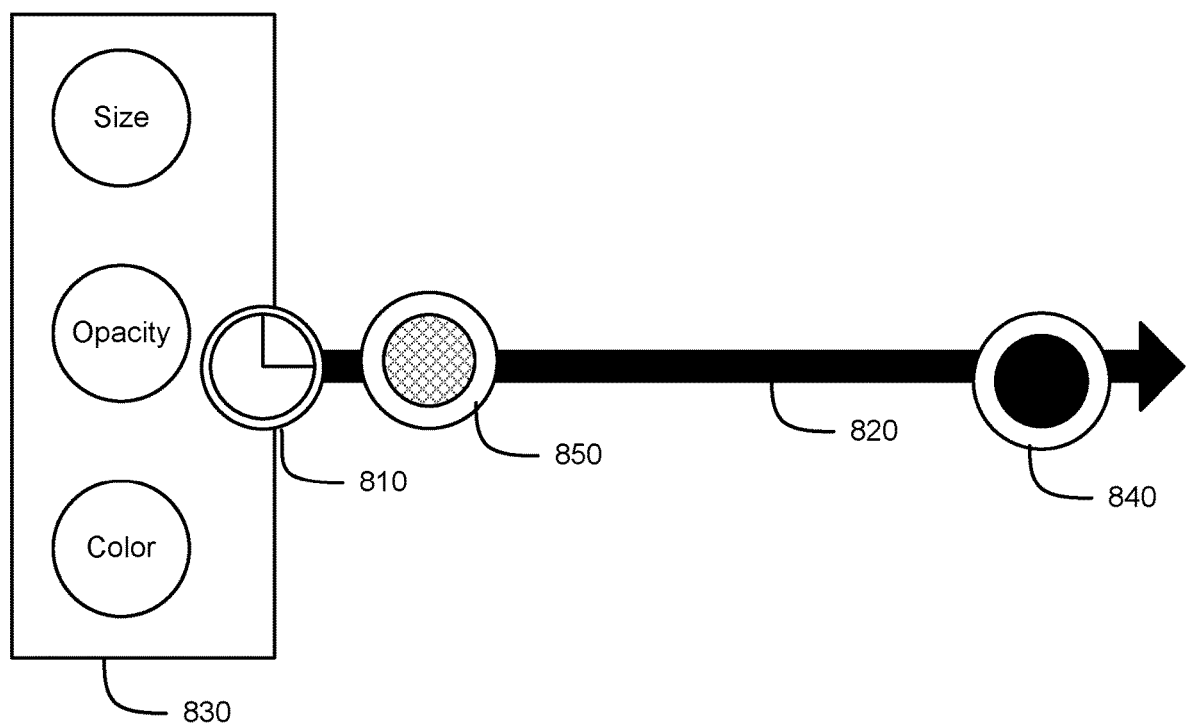
FIG. 8 illustrates yet another example two-dimensional user action associated with using the UI preview element to adjust properties, according to certain embodiments of the present invention.

FIG. 8 also illustrates another example of a two-dimensional gesture. While a first direction is used in FIG. 7 to activate a property, FIG. 8 illustrates using a time or pressure dimension 810. In an example, the gesture includes holding the UI preview element down for a time duration or using a certain pressure. The time duration and/or the pressures are mapped to selected properties 830. Depending on the length of the time duration or an amount of the pressure as stored in the mapping, a particular property of the selected properties 830 is activated. By moving the UI preview element along a direction 820, the particular property is adjusted.

To illustrate, consider an example where the mapping indicates that a zero to one second hold activates the opacity property, a one to two second hold activates the size property, a two to three second hold activates the color property, and a hold longer than three cancels the selection of the selected properties 830. As such, if a user holds the UI preview element for less than one second, the opacity property is activated. Thereafter, moving the UI preview element along the direction 820, adjusts the opacity property. For instance, moving the UI preview element to the right increases the opacity (shown as UI preview element 840 with a solid inner circle). Moving the UI preview element to the left decreases the opacity (shown as UI preview element 850). If the UI preview element is held for more than one second, but less than two seconds, the size property is activated. Thereafter, moving the UI preview element along the direction 820, adjusts the size property. Activation and adjustment of the opacity property is also possible by holding the UI preview element for more than two, but less than three, seconds and followed by a movement along the direction 820. A similar mapping can be defined and used for the pressure dimension.

Figure 9:
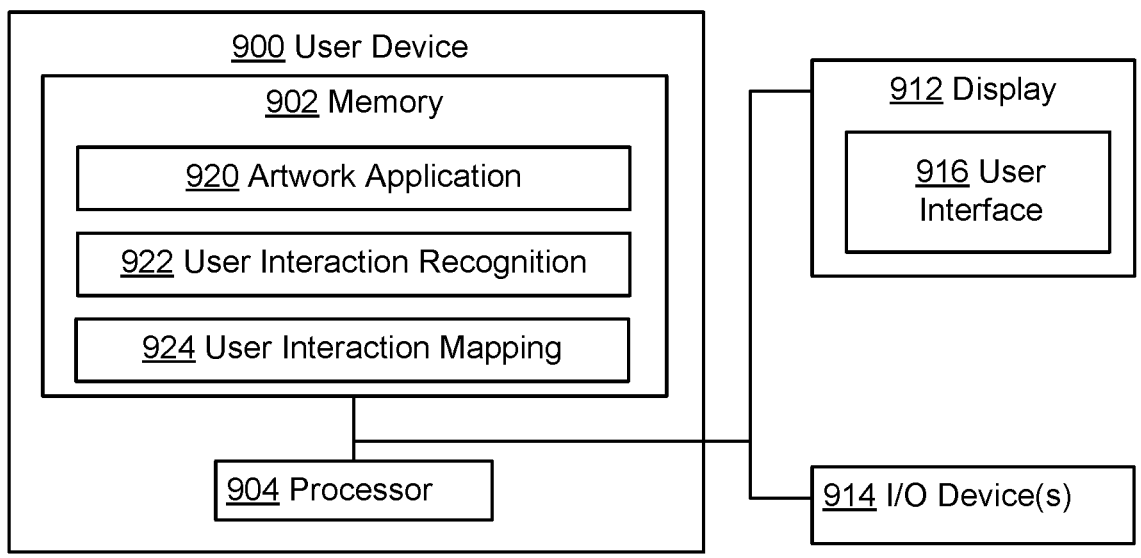
FIG. 9 illustrates an example computing device for implementing an artwork application that presents a UI preview element, according to certain embodiments of the present invention.

Turning to FIG. 9, the figure illustrates an example user device 900 that hosts an artwork application 920. The user device 900 refers to any computing or other electronic equipment accessible to a user, executes instructions, and includes any type of processor-based equipment that operates an operating system or otherwise executes instructions. The user device 900 will typically include a processor that executes program instructions and may include external or internal components such as a mouse, a CD-ROM, DVD, a keyboard, a display, or other input or output equipment. Examples of user devices are personal computers, digital assistants, personal digital assistants, cellular phones, mobile phones, smart phones, pagers, digital tablets, laptop computers, Internet appliances, other processor-based user devices, and television viewing user devices.

In an example, the user device 900 includes a computer-readable medium such as memory 902 coupled to a processor 904 that executes computer-executable program instructions and/or accesses stored information. The processor 904 includes a microprocessor, an ASIC, a state machine, or other processors, and can be any of a number of computer processors. Such a processor includes, or is in communication with, a computer-readable medium which stores instructions that, when executed by the processor, cause the user device 900 to perform the operations described herein.

A computer-readable medium includes, but is not limited to, an electronic, optical, magnetic, or other storage user device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C#, Visual Basic, Java, Python, Perl, JavaScript, and ActionScript.

As illustrated in FIG. 9, the memory 904 includes the artwork application 920. The artwork application is configured to render a digital canvas, a menu, and art tools and to generate artwork based on user input related to the digital canvas, menu, and art tools. For example, the artwork application 920 includes an application such as ADOBE® PHOTOSHOP SKETCH®, ADOBE® ILLUSTRATOR DRAW®, or another artwork application.

In addition, the memory 904 includes a user interaction recognition module 922 and a user interaction mapping module 924. A user interaction includes an interaction of the user of the user device 900 with the artwork application 920. The interaction depends on a user interface 916 of the user device 900. For example, the user interaction represents a gesture for a touch screen user interface 916 or a mouse movement and click for a desktop. The user interaction recognition module 922 is configured to recognize the user interaction based on data about the user interaction. To illustrate and for a touchscreen user interface 916, the data includes a location, a movement, a distance in pixels, an orientation, a tap, a number of taps, a hold, a hold time duration, a pressure (e.g., based on capacitance change), a pressure amount, and other gesture-related data. The user interaction recognition module 922 recognizes a gesture that the user is providing at the touchscreen user interface 916 based on the associated data. For example, if the user finger taps and moves along the touchscreen user interface, the user interaction recognition module 922 recognizes a swipe gesture along a particular direction for a particular distance length.

On the other hand, the user interaction mapping module 924 includes mappings of different gestures (e.g., as recognized by the user interaction recognition module 922) to an input the artwork application 920. For example, the user interaction mapping module 924 maps the multi-dimensional gestures described in connection with FIGS. 4-8 to activation and adjustments of properties, as applicable. As such, the user interaction mapping module 924 maps a swipe gesture along a particular direction for a particular distance length to, for instance, a particular increase to a property value of an art tool.

In an example, the user interaction recognition module 922 and the user interaction mapping module 924 are integrated with the artwork application 922 (e.g., modules within, a plug-in extension, or another type of integration). In another example, the user interaction recognition module 922 and the user interaction mapping module 924 are from, but interface with the artwork application 922.

To facilitate interactions with a user, the artwork application 920 or another application stored in the memory 902 supports the user interface 916. The user interface is presented (e.g., displayed) to the user on an I/O device 914 connected to the user device 900. The I/O device includes, for example, a display. In a further example, the display implements a touchscreen technology. Other I/O devices 914 are also possible, such as a keyboard and a mouse. By operating any of the I/O devices 912-914, the user interfaces with the artwork application 920 and provides different user interactions. These user interactions are recognized by the user interaction recognition module 922 and mapped to an input to the artwork application 922 by the user interaction mapping module 924. In turn, the artwork application 922 performs operations corresponding to the user interactions.

Figure 10:
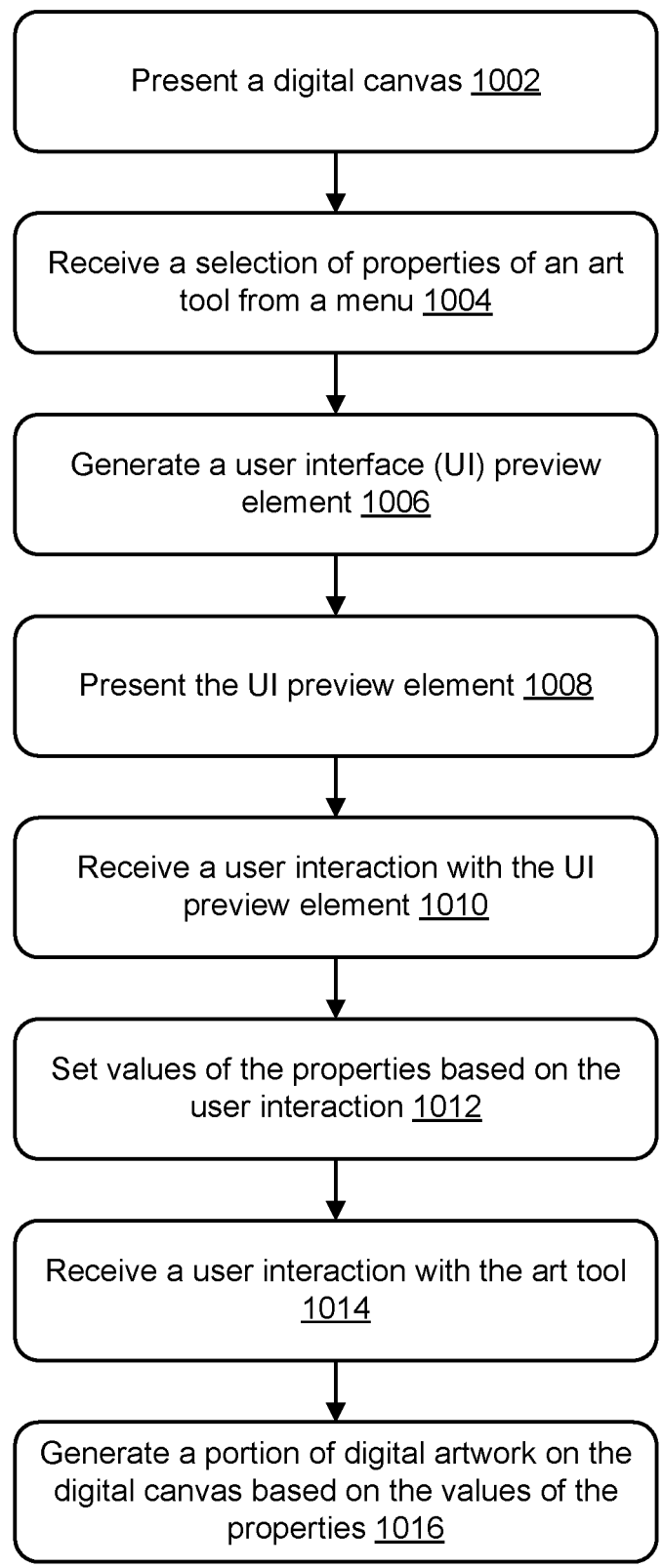
FIG. 10 illustrates an example flow for generating a UI preview element and adjusting properties of an art tool, according to certain embodiments of the present invention.
Figure 11:
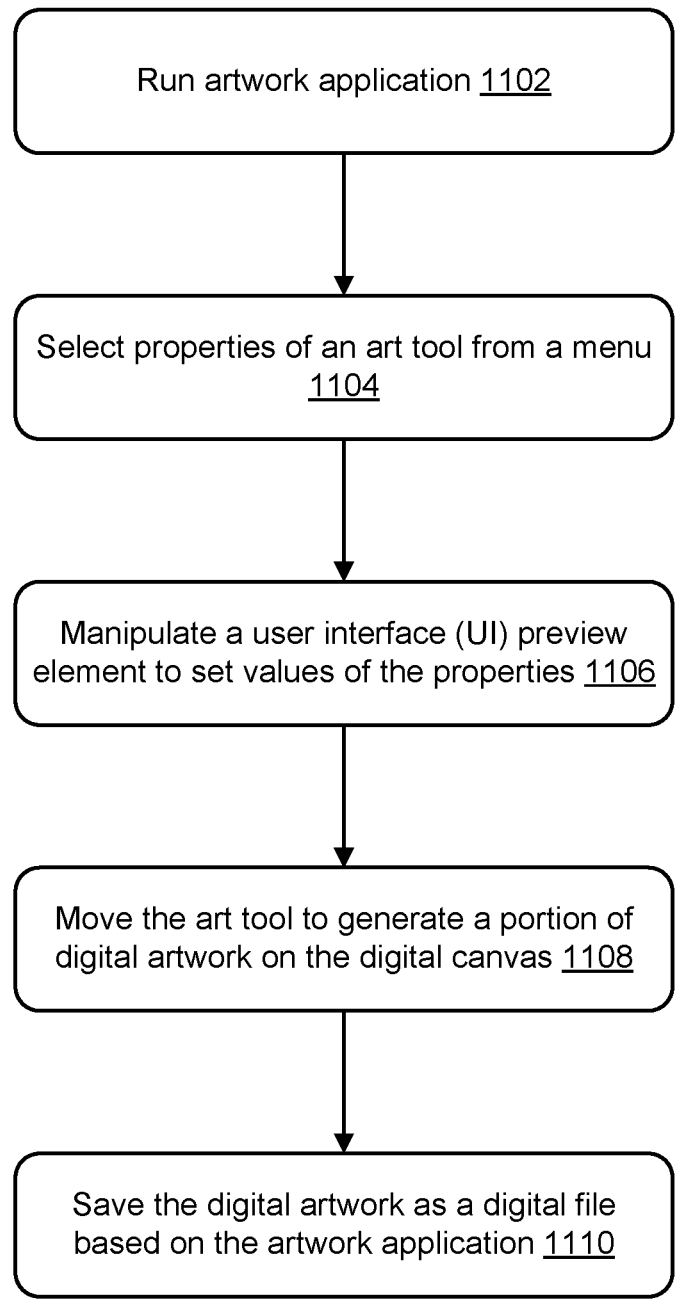
FIG. 11 illustrates an example flow for using a UI preview element, according to certain embodiments of the present invention.

Turning to FIGS. 10-11, the figures illustrate example flows for generating digital artwork. In particular, the example flow of FIG. 10 illustrates operations that an artwork application implements to generate the digital artwork. These operation includes, for instance, implementing a UI preview element. In comparison, the example flow of FIG. 11 illustrates a back-and-forth between a user and the artwork application via a user interface to generate the digital artwork. Some of the operations between the two example flows can be similar. Such similarities are not repeated herein in the interest of clarity of explanation.

While the operations are illustrated in a particular order, it should be understood that no particular order is necessary and that one or more operations may be omitted, skipped, and/or reordered. In the interest of clarity of explanation, the artwork application is described as performing some of the illustrative operations. Nevertheless, other or additional applications and modules of a user device may be configured to implement one or more of the operations and/or one or more steps of the operations.

The example flow of FIG. 10 starts at operation 1002, where the artwork application presents a digital canvas. For example, the digital canvas is presented at a user interface of the user device running the artwork application. In addition, the artwork application presents a menu and an art tool. The menu and the art tool are displayed on the digital canvas (e.g., on a side of the digital canvas) or are disassociated from the digital canvas (e.g., presented in a window that is located outside the boundaries of the digital canvas). As presented, the menu includes different properties of the art tool. The art tool can be switched such that the user is able to select a particular art tool to use for applying to the digital canvas and generating a portion of the artwork given the art tool's properties.

At operation 1004, the artwork application receives a selection of properties of the art tool from the menu. For example, the user provides a user interaction at the user interface. That interaction is recognized and translated into the selection of properties. The selection is inputted to the artwork application. Multiple properties are selected, which corresponds to requesting multiple property adjustments.

At operation 1006, the artwork application generates a UI preview element. The UI preview element is configured to present respective values of the selected properties on the digital canvas. At operation 1008, the artwork application presents the UI preview element. This element is presented on the digital canvas. The presentation includes previewing for each, some, or all of the selected properties the respective value(s) in a one-to-one ratio on the digital canvas. Optionally, the presentation also includes presenting for each, some, or all of the selected properties the respective numerical value(s).

At operation 1010, the artwork application receives a user interaction associated with the UI preview element. For example, the user provides the user interaction at the user interface. The user interaction includes a manipulation of the UI preview element, such as a movement along a particular direction or along different directions, a hold for a time duration, and/or an amount of pressing. The manipulation corresponds to activating and adjusting, as applicable, each, some, or all of the selected properties.

At operation 1012, the artwork application sets (e.g., updates) values of the selected properties based on the user interaction. For example, the user interaction is recognized and mapped to activating and adjusting some or all of the selected properties. Adjusting a property includes changing a value of the property. The artwork application updates the UI preview element to preview each, some, or all of the resulting changes in a one-to-one ratio on the digital canvas and, optionally, present numerical value(s) corresponding to the values of the properties. Once the user interaction is complete (e.g., the user stops using the touchscreen for a certain time duration, such as by removing a finger applied to a touchscreen, completing a mouse click, etc.), the artwork application updates the values of the properties according to these changes.

At operation 1014, the artwork application receives a user interaction associated with the art tool. For example, the user provides the user interaction at the user interface. The user interaction includes a manipulation of the art tool, such as an application of the art tool to a location(s) on the digital canvas. The manipulation corresponds to generating, such as drawing, sketching, or painting, a portion of the digital artwork on the digital canvas.

At operation 1016, the artwork application generates the portion of the digital artwork on the digital canvas based on the property values of the art tool. For example, the user interaction is recognized and mapped to applying the art tool on the digital canvas. The artwork application generates the portion of the digital artwork accordingly. Operations 1004-1016 are repeated as applicable to update the properties and apply the art tool (and, similarly, other art tools) until a user interaction is received to exit the artwork application.

FIG. 11 illustrates an example flow for the back-and-forth interaction between the artwork application and the user via the user interface. The example flow starts at operation 1102, where the user device runs the artwork application. For example, the user operates an I/O device of the user device (e.g., touchscreen or a mouse) to select and request an execution of the artwork application. In response, the user device executes the artwork application.

At operation 1104, the artwork application presents the menu to the user at the user interface, thereby allowing the user to select particular properties from the menu via the user interface. At operation 1106, the artwork application presents the UI preview element to the user on the digital canvas at the user interface. This allows the user to manipulate the UI preview element in different directions over the digital canvas, thereby adjusting values of the selected properties. In turn, the artwork application sets these values for use in connection with applying the art tool on the digital canvas.

At operation 1108, the artwork application presents a projected end of the art tool to the user on the digital canvas at the user interface. This allows the user to manipulate the art tool in different directions over the digital canvas, thereby applying the art tool on the digital canvas. In turn, the artwork application generates, edits, or deletes a portion of the digital artwork on the digital canvas.

At operation 1110, the digital artwork is saved as a digital file based on the artwork application. The digital artwork is saved at the user device, on a server, or at a network location according to a file extension supported by the artwork application. In an example, the artwork application automatically saves the digital artwork at regular time intervals. In a further example, the artwork application presents a menu selection for the user to save the digital artwork. Based on a user interaction indicating this menu selection, the artwork application saves the digital artwork.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for previewing and setting properties of an art tool used to add or change a portion of digital artwork in an application configured to compose the digital artwork, the computer-implemented method comprising:
   presenting, by a processor executing the application, a digital canvas on which the digital artwork is composed, a menu to specify the properties of the art tool, and a preview element that comprises a preview of an end of the art tool;
   receiving, by the processor, a hold input on the preview element, wherein different durations of hold inputs respectively correspond to different selections of the properties of the art tool from the menu;
   determining, by the processor, that the received hold input has a particular one of the different durations;
   selecting, by the processor, a particular one of the properties of the art tool that corresponds to the particular one of the different durations for the hold input;
   receiving, by the processor, a user interaction with the preview element, wherein the user interaction with the preview element includes a movement of the preview element by a user of the application; and
   updating, by the processor, a value of the particular one of the properties of the art tool based on the user interaction.

2. The computer-implemented method of claim 1, further comprising:
   receiving, by the processor, a second user interaction with the art tool on the digital canvas; and
   generating, by the processor, the portion of the digital artwork based on the second user interaction and the updated value of the particular one of the properties.

3. The computer-implemented method of claim 1, wherein the properties comprise a size of the end of the art tool, wherein the updated value comprises a size value, and wherein the preview of the end of the art tool is sized according to the size value on the digital canvas.

4. The computer-implemented method of claim 1, further comprising:
   receiving, by the processor, an additional user interaction that represents a first change to a first value of a first property along a first dimension and a second change to a second value of a second property along a second dimension;
   determining, by the processor, the first change and the second change based on a mapping of user interactions to value changes; and
   updating, by the processor, the first value based on the first change and the second value based on the second change.

5. The computer-implemented method of claim 4, wherein the additional user interaction comprises an additional movement of the preview element along a two dimensional coordinate system, and wherein the first value and the second value are updated based on the additional movement.

6. The computer-implemented method of claim 1, further comprising:
receiving, by the processor, an additional user interaction that comprises a rotational movement and a translational movement of the preview element,
updating, by the processor, a first value of a first property of the properties based on the rotational movement; and
setting, by the processor, a second value of a second property of the properties based on the translational movement.

7. The computer-implemented method of claim 1, wherein the menu is configured to present the properties along a first direction, further comprising:
receiving, by the processor, an additional user interaction that comprises a first movement of the preview element along the first direction and a second movement of the preview element along a second direction, wherein the second direction intersects the first direction;
selecting, by the processor, a first property of the properties based on the first movement; and
updating, by the processor, a first value of the first property based on the second movement.

8. The computer-implemented method of claim 1, wherein the user interaction comprises changes to the particular one of the properties, wherein the computer-implemented me thod further comprises:
updating, by the processor, the preview element to preview the changes over the digital canvas and to present numerical values of the changes.

9. A system comprising:
a processor;
a memory communicatively coupled to the processor and bearing instructions that, upon execution by the processor, cause the system to at least:
present a digital canvas on which digital artwork is composed, a menu to specify properties of an art tool, and a preview element that comprises a preview of an end of the art tool;
receive a hold input on the preview element, wherein different durations of hold inputs respectively correspond to different selections of the properties of the art tool from the menu;
determine that the received hold input has a particular one of the different durations;
select a particular one of the properties of the art tool that corresponds to the particular one of the different durations for the hold input;
receive a user interaction with the preview element, wherein the user interaction with the preview element includes a movement of the preview element by a user; and
update a value of the particular one of the properties of the art tool based on the user interaction.

10. The system of claim 9, wherein the preview element is configured to preview a default value of the particular one of the properties and the updated value.

11. The system of claim 10, wherein the preview element has a shape based on the end of the art tool, and wherein previewing the default value comprises previewing an upper limit of the value in association with an outer boundary of the shape of the preview element.

12. The system of claim 10, wherein the preview element has a shape, wherein previewing the default value comprises previewing a lower limit of the value as an inner boundary within the shape of the preview element.

13. The system of claim 9, wherein the menu is configured to present the particular one of the properties according to a shape, and wherein the preview element is configured to replicate the shape.

14. A computer-readable storage medium storing instructions that, when executed on a computing device, configure the computing device to perform operations comprising:
presenting a digital canvas on which digital artwork is composed, a menu to specify properties of an art tool, and a preview element that comprises a preview of an end of the art tool;
receiving a hold input on the preview element, wherein different durations of hold inputs respectively correspond to different selections of the properties of the art tool from the menu;
determining that the received hold input has a particular one of the different durations;
selecting a particular one of the properties of the art tool that corresponds to the particular one of the different durations for the hold input;
receiving a user interaction with the preview element, wherein the user interaction with the preview element includes a movement of the preview element by a user; and
updating a value of the particular one of the properties of the art tool based on the user interaction.

15. The computer-readable storage medium of claim 14, wherein the operations further comprise:
receiving a second user interaction on the digital canvas to change a sensitivity for previewing and adjusting the particular one of the properties; and
updating a mapping between the movement of the preview element and a change to the value of the particular one of the properties based on the sensitivity for previewing and adjusting the particular one of the properties.

16. The computer-readable storage medium of claim 14, wherein the user interaction comprises overlaying the preview element over a portion of the digital artwork on the digital canvas, and wherein the preview element is configured to sample and preview a size and an opacity of the portion of the digital artwork.

* * * * *